(12) United States Patent
Aotsuka

(10) Patent No.: US 7,184,174 B2
(45) Date of Patent: Feb. 27, 2007

(54) COLOR PICTURE SIGNAL PROCESSING METHOD AND COLOR PICTURE USING THE METHOD

(75) Inventor: Yasuo Aotsuka, Miyagi (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 985 days.

(21) Appl. No.: 10/222,883

(22) Filed: Aug. 19, 2002

(65) Prior Publication Data

US 2003/0038956 A1  Feb. 27, 2003

(30) Foreign Application Priority Data

Aug. 22, 2001 (JP) ............................ 2001-251063

(51) Int. Cl.
*G06F 15/00* (2006.01)
(52) U.S. Cl. ...................... 358/1.9; 358/515; 358/520; 382/167
(58) Field of Classification Search ................ 358/1.9, 358/515, 520; 382/167
See application file for complete search history.

(56) References Cited

U.S. PATENT DOCUMENTS

| | | | |
|---|---|---|---|
| 6,618,502 B1* | 9/2003 | Okada et al. | 382/167 |
| 6,816,613 B2* | 11/2004 | Tohyama et al. | 382/167 |
| 2003/0038956 A1* | 2/2003 | Aotsuka | 358/1.9 |
| 2003/0179926 A1* | 9/2003 | Yamazoe et al. | 382/167 |
| 2004/0095432 A1* | 5/2004 | Kakutani | 347/43 |
| 2004/0263456 A1* | 12/2004 | Miyachi et al. | 345/88 |

* cited by examiner

*Primary Examiner*—David Moore
*Assistant Examiner*—Michael Burleson
(74) *Attorney, Agent, or Firm*—Arent Fox, LLP

(57) ABSTRACT

A color picture signal processing method includes the steps of: (a) inputting picture signal data; (b) converting the picture signal data to data of luminance Y and color differences Cr and Cb on a Y-Cr-Cb space; and (c) executing a color difference matrix calculation by using at least one pair of equations. By the invention, it may be is possible to obtain a color picture signal wherein a hue circle of a flesh color is suppressed.

14 Claims, 10 Drawing Sheets ized by the color difference ratio of the proper exposure.
COLOR PICTURE SIGNAL PROCESSING METHOD AND COLOR PICTURE USING THE METHOD

CROSS REFERENCE TO RELATED APPLICATION

This application is based on Japanese Patent Application 2001-251063, filed on Aug. 22, 2001, the entire contents of which are incorporated herein by reference.

BACKGROUND OF THE INVENTION

A) Field of the Invention

This invention relates to a color picture signal processing technique and more specifically to a color picture signal processing technique that can suppress a hue circle of a flesh color.

B) Description of the Related Art

Recently in the field of a digital still camera that uses a CCD solid-state device or a MOS solid state device, a resolution not inferior to that of conventional photographs comes to be attained by a rapid increase of the number of pixels.

A color reproductivity of the digital camera is still inferior to that of a conventional silver salt film photograph. Especially, a dynamic range of the digital camera is narrower, and a hue circle will be easy to occur in a case of over exposure, that is, a hue changes dramatically at the time of the over exposure. The hue circle wherein a human flesh color becomes yellowish has especially been a problem in terms of color reproduction quality of the flesh color.

SUMMARY OF THE INVENTION

It is an object of the present invention to provide a color picture signal processing technique that can control a hue circle of the flesh color.

According to one aspect of the present invention, there is provided a color picture signal processing method comprising the steps of: (a) inputting picture signal data of primary colors or complementary colors; (b) converting said picture signal data to data of luminance Y and color differences Cr and Cb on a Y-Cr-Cb space; and (c) executing a color difference matrix calculation by using at least one pair of equations (i) to (iv), wherein, Cr'=Cr×A/K+Cb×B, Cb'=Cr×C+Cb×D . . . (i), Cr'=(Cr×A+Cb×B)/K, Cb'=Cr×C+Cb×D . . . (ii), Cr'=Cr×A+Cb×B, Cb'=Cr×C+Cb×D×K . . . (iii), and Cr'=Cr×A+Cb×B, Cb'=(Cr×C+Cb×D)×K . . . (iv), Provided, A, B, C and D are color difference matrix coefficients, K is a function of Y and also a correction coefficient larger than 0. K is determined to fix a color difference ratio H (=Cr'/Cb') regardless of the luminance Y. Cr' and Cb' are color differences after correction.

According to the above-described color picture signal processing method, influence of hue circle of a flesh color at under exposure and over exposure will be suppressed because the K value is defined depending on the luminance Y to make the color difference ratio H (=Cr'/Cb') constant regardless of the luminance in the equations used for a color difference matrix calculation.

In a color picture signal processing technique for a digital still camera or the likes, turning yellow (a hue circle) of a flesh color in a part where photograph lighting is strong can be suppressed. Also, when a picture taken by a color imaging device such as a digital still camera is displayed or printed, a color picture with good color reproduction quality can be displayed or printed by adjusting the turning yellow of the flesh color.

DETAILED DESCRIPTION OF THE PREFERRED EMBODIMENTS

Figure 1:
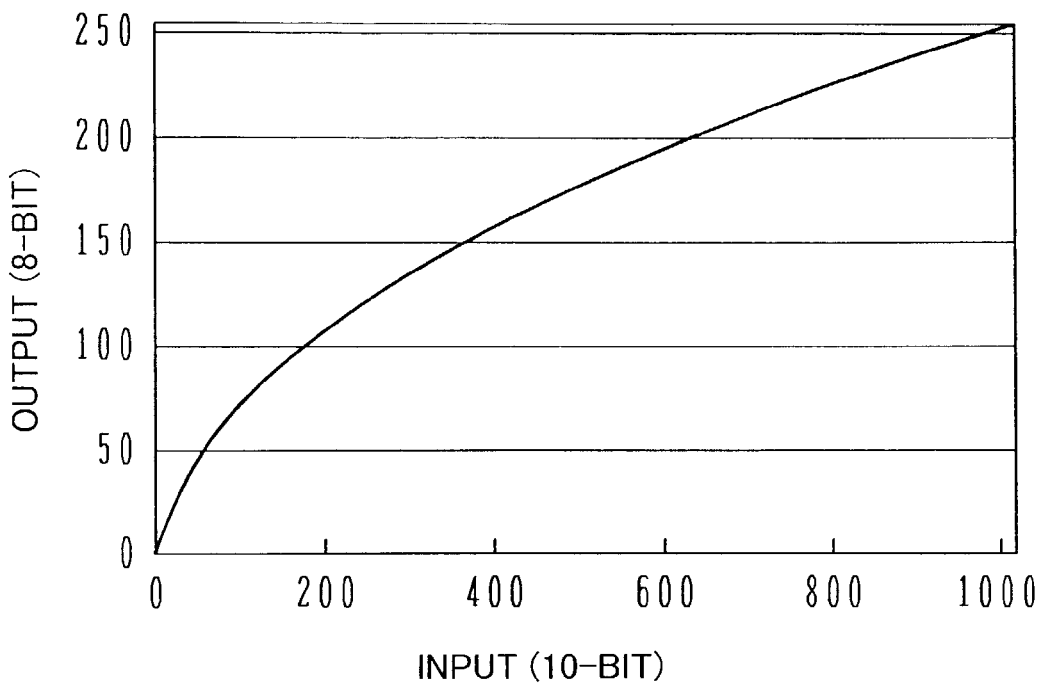
FIG. 1 is a graph showing a gamma conversion curve when a general color picture processing technique is used.
Figure 2:
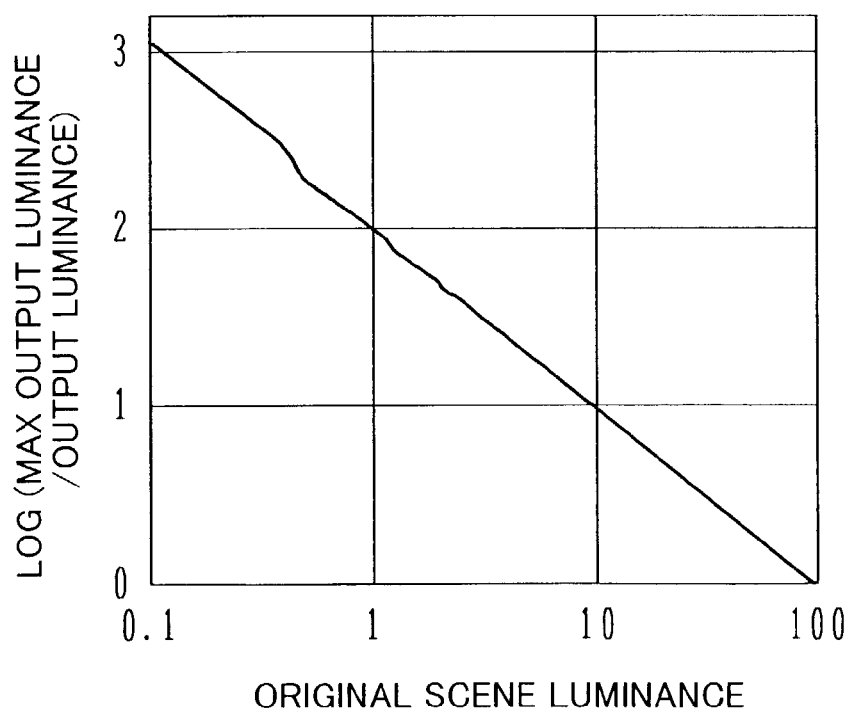
FIG. 2 is a graph showing a characteristic curve showing a relation between original scene luminance and output luminance when a general color picture processing technique is used.
Figure 3:
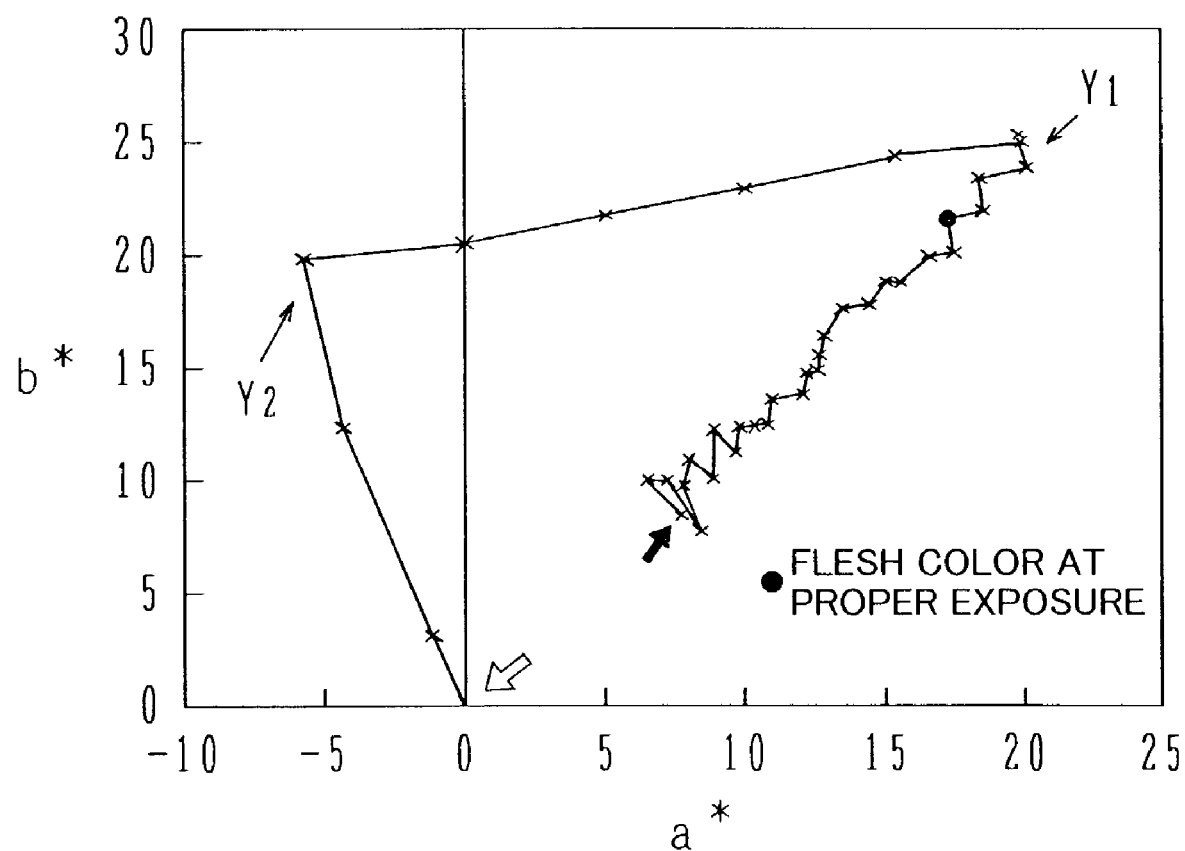
FIG. 3 is a graph showing a chromaticity point of the flesh color when a general color picture processing technique is used.

A hue circle regarding to a flesh color will be explained below with reference to FIGS. 1 to 3, taking an example in a digital still camera using a CCD solid-state imaging device having primary color spectral sensitivity as an example. The hue circle regarding to the flesh color is explained with reference to FIG. 1 to FIG. 3. FIG. 1 shows a gamma conversion curve of the digital still camera. FIG. 2 is a graph showing a luminance signal (max output luminance/output luminance) of a final output picture, plotted to a luminance of an original scene (original scene luminance; at an optional unit). In FIG. 2, both a vertical axis and a horizontal axis are plotted with a logarithm scale. A graph in FIG. 2 is called a characteristic curve. FIG. 3 is a graph showing chromaticity points of the flesh color on a-b coordinates. Although a brightness L axis actually exists in a normal direction of an a*-b* plane, it is omitted in FIG. 3.

A 10-bit digital picture data is obtained by A/D conversion of the input picture information that is taken by each spectral sensitivity of R, G and B of the digital still camera. Then, eight-bit output digital picture signals are obtained by gamma-conversion of the digital picture data obtained above.

FIG. 1 is the gamma conversion curve wherein the horizontal axis represents an input, and the vertical axis represents an output. As shown in FIG. 1, an increase of the input brings a monotonic increase of the output.

As shown in FIG. 2, when a relation between luminance signal value of a final picture output and luminance signal value of an original scene are plotted on a logarithm scale, approximately straight relationship can be obtained. Unless this characteristic curve becomes not straight and luminance signal is saturated, the hue in any colors is fixed regardless of the amount of exposure in an output picture.

Although, for example, when the amount of an exposure light increases, an output signal of either one of R, G or B in the case of primary colors becomes saturated at first. The saturation of the output signal of either one of R, G or B causes the hue circle.

FIG. 3 shows chromaticity points of the flesh color at coordinates a-b (in the case of primary colors). In FIG. 3, a point represented by a solid circle is a chromaticity point of the flesh color at a proper amount of exposure light (a proper exposure value) of which none of R, G and B is saturated. The chromaticity point of the flesh color is provided as standard value at this proper amount of exposure light. In a range between an under exposure (represented by a solid arrow) of 1/16 times of the standard value and an over exposure (represented by a hollow arrow) of 8 times of the standard value, the amount of exposure light was changed by multiplying 1/6 power of 2 at a time, and the chromaticity point of the flesh color at each time was represented by an x-mark, and each of the x-marks were connected by straight lines with others.

As shown in FIG. 3, in the range of the proper amount of the exposure light, both of the chromaticity values a* and b* of the flesh color are positive in the a*-b* plane. When the amount of the exposure light is changed toward the side of the over exposure, the chromaticity value b* increases along with an increase in the chromaticity value a*. When the amount of the exposure light is increased, over the proper amount of exposure light (over a first amount of exposure light: Y1), the chromaticity point of the flesh color curves leftward on the a*-b* plane. This phenomenon is caused by a saturation of the R signal. The saturation is a phenomenon wherein an output value of the R signal does no longer increase although the amount of exposure light increases. By increasing the amount of the exposure light, the flesh color changes toward an Y(yellow) G(green) taste direction. At a second amount of the exposure light Y2 that is larger than the first amount of the exposure Y1, the chromaticity point of the flesh color rapidly curves to the lower right direction on the a*-b* plane. That is because the G signal is saturated at that time. Therefore, after that time, only the B signal is not saturated and so the flesh color becomes yellow. So-called "change to yellow" occurs. When the B signal is also saturated, the flesh color will be white because it will be a*=b*=0.

The above-described phenomenon can be summarized as follows.

In the picture imaging device having a solid-state imaging device, a color picture is input by a primary color spectral sensitivity such as R, G, and B, or complementary color sensitivity such as Y, M, C, G, and W. The signal that is taken in by these sensitivity reaches so called a saturation level when the amount of the exposure light is large, and the output signal value is fixed although the amount of exposure light is larger than that. The most case of this saturation phenomenon is not observed in all the color sensitivity. For example, when only an output value of one of spectral sensitivity is saturated, a signal component will become insufficient. This causes the hue circle.

Especially, in the digital still cameras and digital movies wherein the picture quality improves remarkably, the hue circle as described above occurs. Especially, a turning yellow of the flesh color is remarkable. An auto exposure mechanism (AE) is attached to a camera, and although a proper exposure is decided by using that, the hue circle may occur. Especially, in photographing under the sunlight in a fine weather, the hue circle will be easy to occur in an area strongly reflecting the sunlight.

Figure 4:
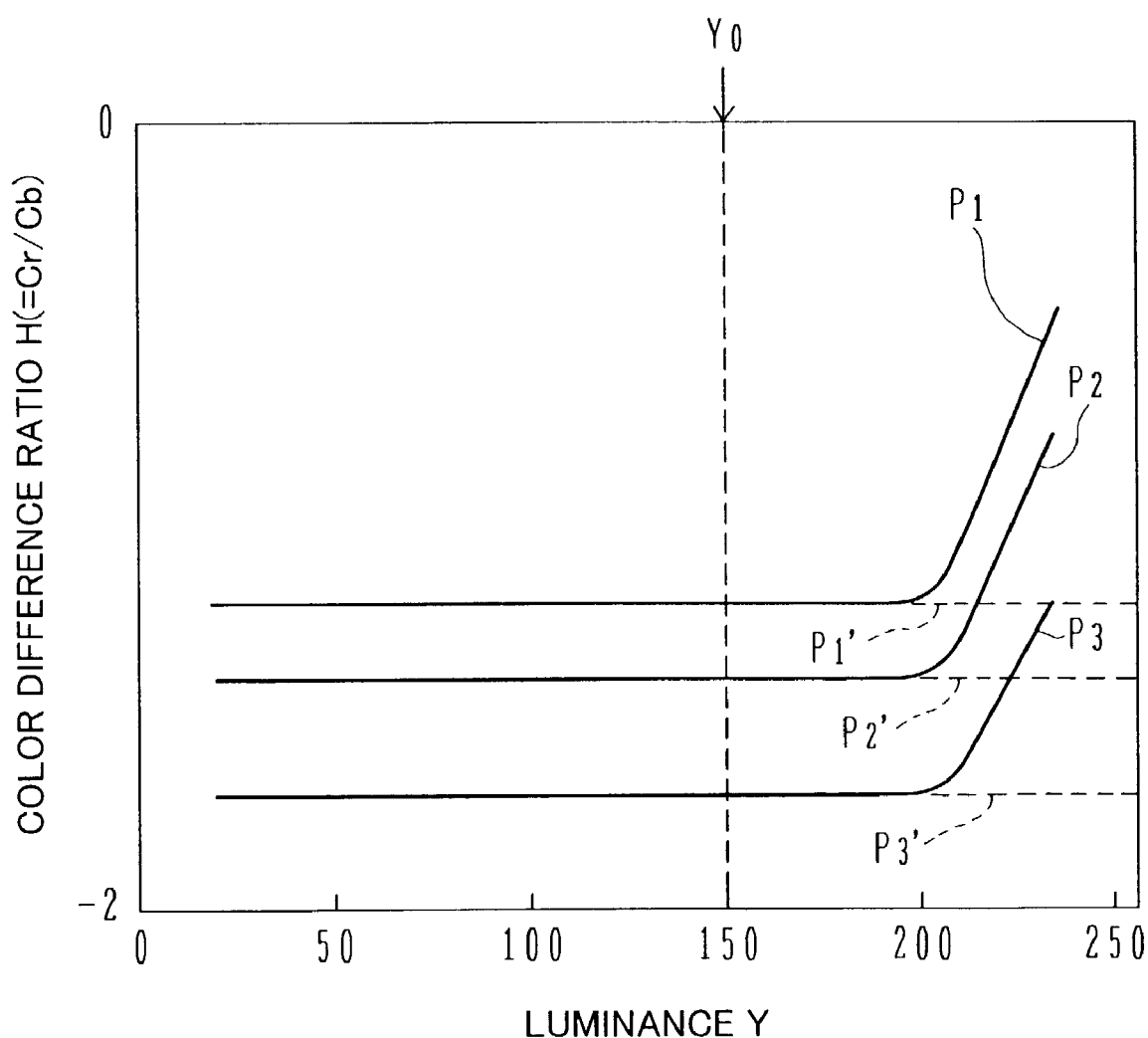
FIG. 4 is a graph showing dependency of color difference ratio of the flesh color on luminance when a general color picture processing technique is used and dependencies of various flesh colors.
Figure 5:
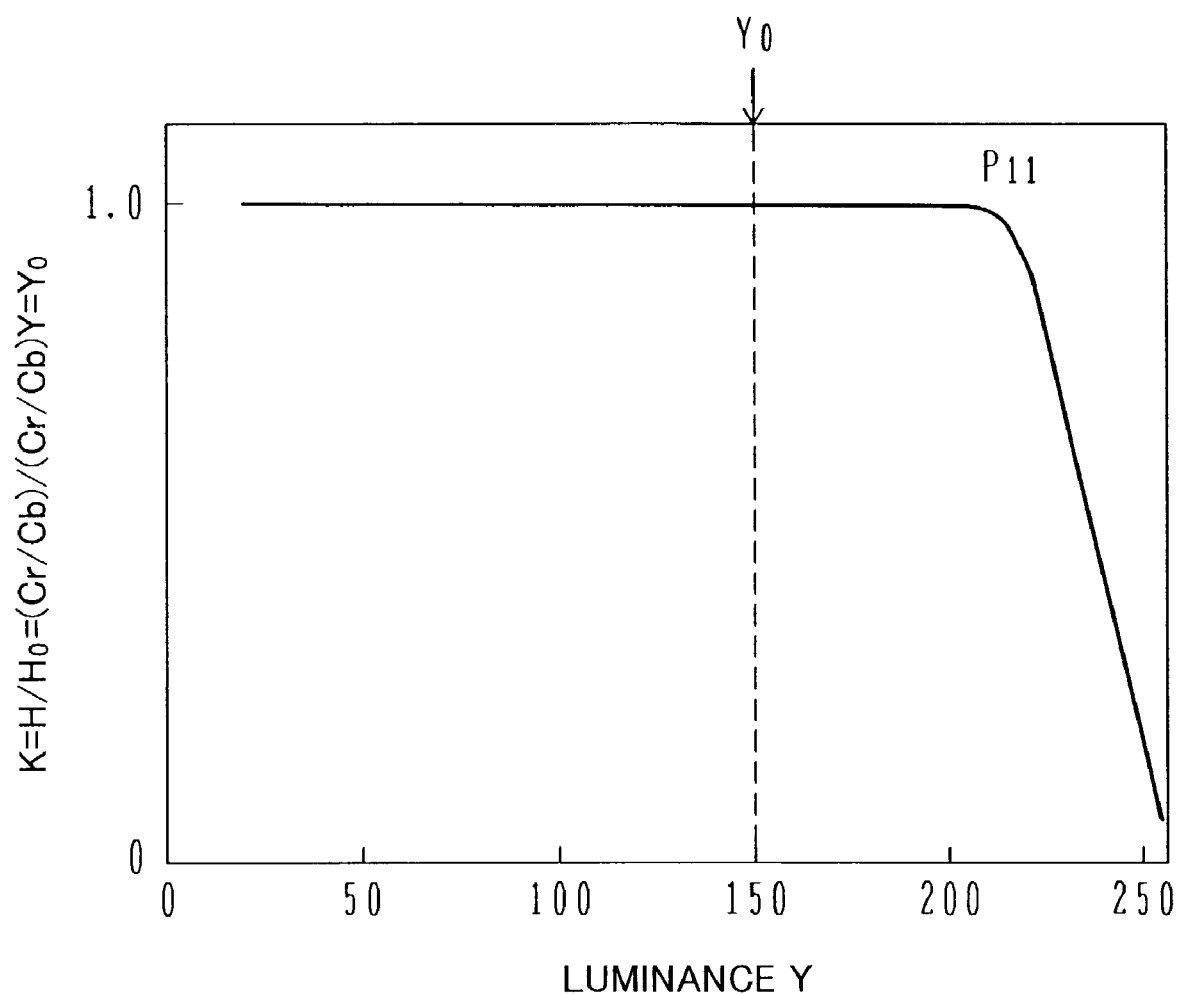
FIG. 5 is a graph showing luminance dependency of color difference ratio (K value) normalized by color difference ratio at a time of a proper exposure.

In accordance with the above-described results of the experiment, the inventor made a consideration described below. The study by the inventor will be explained with reference to FIGS. 4 and 5. FIG. 4 is a schematic graph showing an examined luminance Y dependency of color difference ratio H (=Cr/Cb) concerning various skin types. FIG. 5 is a schematic graph showing the color difference ratio H obtained by varying the luminance Y for various skins and normalized by the color difference ratio $H_0$ at the luminance $Y=Y_0$ (a luminance at the proper exposing value).

Generally, a camera is designed to record the flesh color as a flesh color in the proper amount of the exposure. The R, G and B (or Y, M, C, G and W) signals are gamma converted by a signal processor within a camera and are converted to the luminance signal (Y) and the color difference signals (Cr and Cb). Further, a color difference matrix algorithm is executed for the signals Cr and Cb for an enhancement of saturation and a hue adjustment. Generally, the color difference matrix algorithm is executed by using following equations (x) and (y).

$$Cr' = Cr*A + Cb*B \quad (x)$$

$$Cb' = Cr*C + Cb*D \quad (y)$$

In the equations (x) and (y), the symbols A to D are color difference coefficients. A proper Cr' and Cb' values can be obtained by making those coefficients proper. All of the values of Cr, Cb, Cr' and Cb' are 0 in the case of no color.

FIG. 4 shows relations between the color difference ratio H (=Cr/Cb) and the luminance Y for P1, P2 and P3 as examples of various skin types. As shown in FIG. 4, the absolute value of the color difference ratio H for each of the skin types P1, P2 and P3 is different at a predetermined luminance Y.

However, it is discovered that the tendency for the color difference ratio H of showing an approximately fixed value up to a certain luminance and increasing the value beyond a predetermined value of luminance (about 200 in FIG. 4) is common for all the skins P1 to P3.

FIG. 5 shows the relation between the luminance Y and the normalized color difference ratio $H/H_0$ for various skin types. The normalized color difference ratio $H/H_0$ for various skin types P1 to P3 has a value around 1 until the fixed value of luminance (200 in FIG. 5). Then, the normalized color difference ratio $H/H_0$ will drop from the value around 1. It was found that the relation between the luminance Y and the normalized color difference ratio $H/H_0$ for various skin types can be represented by a common curve as shown in FIG. 5.

The normalized color difference ratio $H/H_0$ in each luminance Y can be obtained from FIG. 5. This value is called a K value. The K value for each luminance Y is obtained from FIG. 5, and the color difference Cr or Cb are adjusted by the K value. Then, the color difference ratio H can be obtained even in the higher luminance region than the luminance at which the color difference ratio H begins to shift from a constant value (the luminance 200 in FIG. 4) shown by a broken line P1' to P3' in FIG. 4.

That is, instead of the color difference matrix calculation based on the above-described equations (x) and (y), either one of following methods (I) and (II) can be used for making the calculated color difference ratio at the high luminance at a constant value to decrease the hue circle.

Change (I): Calculating by following equation (i) or (ii) instead of using the equation (x).

$$Cr' = Cr \times A/K + Cb \times B \qquad (i)$$

or $$Cr' = (Cr \times A + Cb \times B) \qquad (ii)$$

Change (II): Calculating by following equation (iii) or (iv) instead of using the equation (y).

$$Cb' = Cr \times C + Cb \times D \times K \qquad (iii)$$

or $$Cb' = (Cr \times C + Cb \times D) \times K \qquad (iv)$$

The symbols A to D are color difference coefficients. The symbols A and D are diagonal terms, and enhancement of saturation is adjusted through A and D. The symbols B and C are non-diagonal terms, and the hue is adjusted through B and C. The K value is a function of the luminance Y and a value larger than 0.

A calculating method of the K value will be explained below with a practical example.

At first, values Y, Cb, and Cr of a human flesh color (a human skin color) are obtained along a wide range of the exposure between the under exposure and the over exposure. These values can be obtained by actually taking a picture by a digital still camera or the like. Possibly, it can be calculated by a following equation (v).

$$Sn = \int SKIN(\lambda) \cdot P(\lambda) \cdot SENSn(\lambda) \cdot E \cdot d(\lambda) \qquad (v),$$

where $SKIN(\lambda)$ is spectral reflectivity of a human skin, and $\lambda$ represents a wave length of visible light from 380 nm to 780 nm. $P(\lambda)$ is a spectral radiant energy distribution of a photograph light source (generally a sun light). $SENSn(\lambda)$ is nth spectral sensitivity of a camera, and Sn is an output value of the nth spectral sensitivity. The symbol E represents a magnification of exposure amount, that is, a ratio to the proper amount of exposure.

For example, in the case of primary colors, when output values of each of R, G and B are Sr, Sg and Sb are represented by following equations.

$$S_1(=Sr) = \int SKIN(\lambda) \cdot P(\lambda) \cdot Sr(\lambda) \cdot E \cdot d(\lambda) \qquad (v\text{-}i)$$

$$S_2(=Sg) = \int SKIN(\lambda) \cdot P(\lambda) \cdot Sg(\lambda) \cdot E \cdot d(\lambda) \qquad (v\text{-}ii)$$

$$S_3(=Sb) = \int SKIN(\lambda) \cdot P(\lambda) \cdot Sb(\lambda) \cdot E \cdot d(\lambda) \qquad (v\text{-}iii)$$

As represented by the above equations, $S_1 = Sr$, $S_2 = Sg$, and $S_3 = Sb$. Also, in the case of the complementary colors, the above-described equations can be used. Further, in the primary colors "n" equals to 3, whereas "n" equals to 3 or 4 in the complementary colors.

For the wavelength $\lambda$ within a range between 380 nm and 780 nm, the integration based on the above-described equation (v) was performed. By using the value of Sn calculated by the equation (v) and proceeding calculations in accordance with a method of signal processing defined by a design specification of a camera, the values of Y, Cr, and Cb can be obtained.

Further, the values of Y, Cr, and Cb can be obtained by any signal processing methods defined by design specifications of cameras. As contents of the signal processing, a gain adjustment for making white balance, a gamma conversion, Y-Cr-Cb conversion and calculating process like that are generally included. Also, processes such as an A/D conversion and simultaneity are included. Further, the simultaneity means performing an interpolating process for obtaining three kinds of color signals, that is, RGB, for example, in a single module solid-state imaging device.

The color difference matrix calculation may be omitted both in the case of calculating the K value based on the values of Y, Cr, and Cb obtained by photographing and in the case of obtaining the K value based on calculated values of Y, Cr and Cb.

Next, by the calculated Cr and Cb, the color difference ratio H=Cr/Cb is obtained as described above. The K value is obtained by normalizing the color difference ratio H with the color difference ratio $H_0$ at the value of Y near the proper exposure when no saturation occurs.

$$K = H/H_0 \qquad (vi)$$

Further, the K value is a variable value (a function of Y) varying in dependence on the luminance Y. As described above, the flesh color lacks red taste by saturation of R at the over exposure side. It means that |H| becomes small. According to the equation (vi), when the luminance Y becomes higher than the luminance Y at the proper exposure, the value K will become smaller. That is, a degree of the hue circle of the flesh color at the over exposure can be represented by the K value. As far as K equals to 1, the hue of the flesh color approximately does not change. That is, by using at least one of the equations (i) to (iv) as a calculating formula, the color difference ratio H (=Cr/Cb) takes an almost constant value without depending on the amount of the exposure, and the hue of the flesh color is maintained approximately constant.

Also, in the case of the under exposure, there is a problem that the hue of the flesh color changes. In this case, the effect of the hue circle can be adjusted by using the above-described technique. That is, in the case that the hue of the flesh color is changed by the change of the amount of the exposure at the under exposure, it is preferable to obtain the K value also in the range from the minimum value $Y_{min}$ to the value $Y_0$ at the proper exposure of the luminance Y similar to the case of the over exposure. A new value of Cr or Cb can be obtained by substituting the K value for either one of the above-described equations (i) to (iv). In the case when the problem of the hue circle does not occur at the under exposure, the K value can be set equal to 1 within a range below the luminance $Y_0$ at the proper exposure, and the above-described hue adjustment may be performed only at the over exposure side.

The equations (i) and (ii) enlarge the Cr in the high luminance area and the Cr may be pushed out from the color gamut. Therefore, the phenomenon (turning yellow) wherein a skin color becomes yellow at the extremely high luminance can be improved but not completely. Therefore, the equations (i) and (ii) are preferably used in the case of a characteristic curve having small turning yellow, that is, the characteristic curve is extended in the high luminance area of an original scene.

Also, the equations (iii) and (iv) lower the Cb at the high luminance area. Therefore, the Cb will not be pushed out from the color gamut and the hue circle can be completely adjusted. However, color saturation of yellow group at the high luminance area will slightly decrease.

Moreover, a combination of either one of the equations (i) and (ii) and either one of the equations (iii) and (iv) can be used for the color difference matrix calculation. In a case when there is an unpreferable effect on a general color other than the flesh color by using one coefficient without the combination of two equations, using the combined equation is especially effective.

In this case, K1 for the Cr' and K2 for the Cb' can be dividedly used in any ways if a relation K1×K2=K is kept. Of course, in terms of decreasing a load of the calculating process, it is preferable to use either one of coefficients. Therefore, there is a trade-off of improvement of color reproduction quality and simplification of calculating process. Although the equations (i) and (ii) are divisions of the coefficient K, they can be multiplication of a reciprocal number of the coefficient K.

Further, instead of the calculations by the above-described equations (i) to (iv), the calculations can be performed by, for example, using a look-up table (LUT) listing a relationship between the luminance Y and the K value. Besides, for example, in the equation (i), a two-dimensional LUT which directly looks up the value of the Cr' from the values of the luminance Y and the color difference Cr can be used. By using the look-up table, it is possible to shorten the signal processing time and to decrease the manufacturing cost of a camera.

An actual steps of the signal processing used in the above-described color picture signal processing technique in the case of primary colors will be explained below with reference to FIG. 6.

Figure 6:
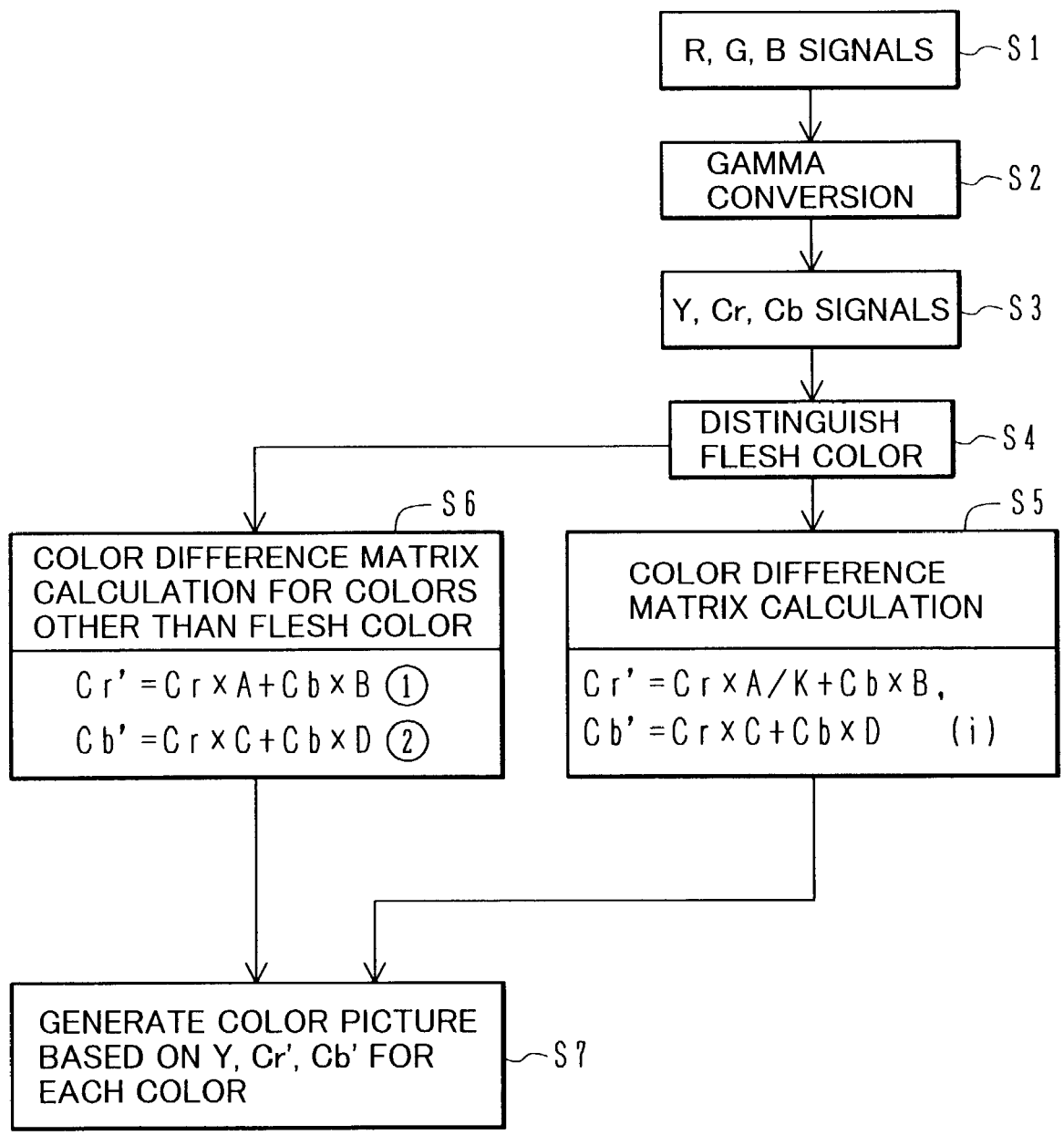
FIG. 6 is a flow chart showing a processing order that is used in a color picture processing technique when a color difference matrix calculation is done by using luminance dependency of a color difference ratio (K value) normalized by the color difference ratio of the proper exposure.

In FIG. 6, the signals of R, G and B are obtained at step S1. Then, at step S2, the RGB signals are gamma converted. As shown at step S3, the luminance signal Y, the color difference signals Cr and Cb are obtained.

At step S5, the color difference algorithm by one of the equations (i) to (iv) is performed. In FIG. 6, the example of the case using the equation (i) is shown. At step S7, the color picture is formed based on the values of Y, Cb' and Cr' obtained at step S5.

When the color picture is generated by the process described above, the hue circle of the flesh color will decrease.

Further, in the above-described processing steps, the same color difference matrix calculations are performed with the flesh color and with the colors other than the flesh color. The flesh color may be distinguished in step 4, and then the process shown at step S5 for the flesh color and the step S6 for the colors other than the flesh color may be performed.

In the case when the look-up table is used, at step 4 and step 5, a process for distinguishing a flesh color and extracting the value of Cr' (or Cb') from the luminance Y and the color difference Cr (or Cb) may be performed by referring to the look-up table.

In the case when the above algorithm is performed for only the flesh color, the distinction of the flesh color can be performed by, for example, limiting the area of the flesh color on the color space of the luminance Y, the color differences Cr and Cb. In that case, designation of the flesh color area can be limited only in the range of the luminance Y wherein the K value is not 1.

By the above-described limitation, a decline of the color saturation of yellow in a high luminance area which occurs, for example, in the case of the equations (iii) and (iv) can be prevented.

Also, in the luminance area of K=1, the algorithm can be omitted.

Further, in case of the flesh color, Cr is greater than 0 and Cb is smaller than 0. Therefore, an algorithm can be performed only under the limitation wherein Cr>0 and Cb<0. Also, in order to avoid a rapid color change between the inner and outer areas of a boundary of the limitation of Cr>0 and Cb<0, the coefficient K value of the algorithm near the boundary can also be gradually brought close to 1. That also can be performed in the case of limiting the flesh color area to be narrower.

Figure 7:
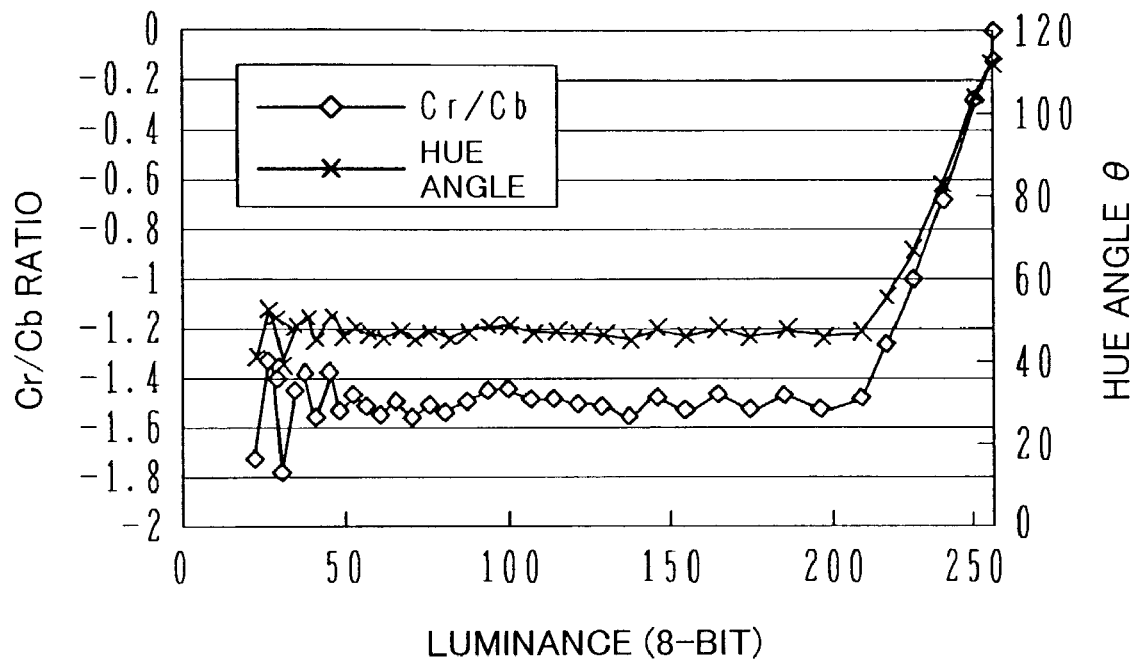
FIG. 7 is a graph showing a luminance dependency of Cr/Cb ratio and a hue angle when a general color picture processing technique is used.
Figure 8:
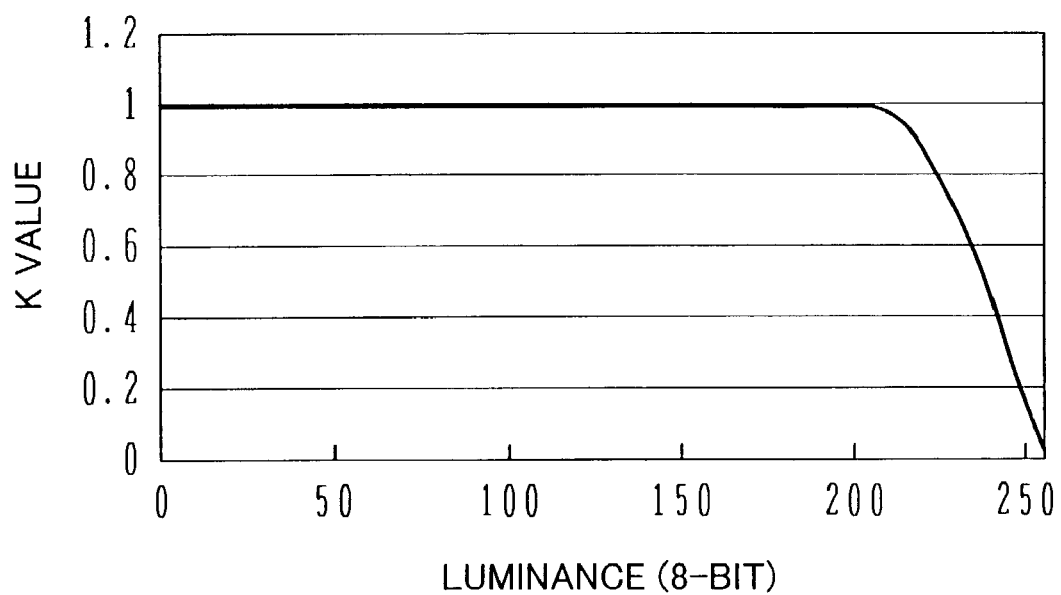
FIG. 8 is a graph showing a luminance dependency of K value when a color picture processing technique according to a first embodiment of the present invention is employed.
Figure 9:
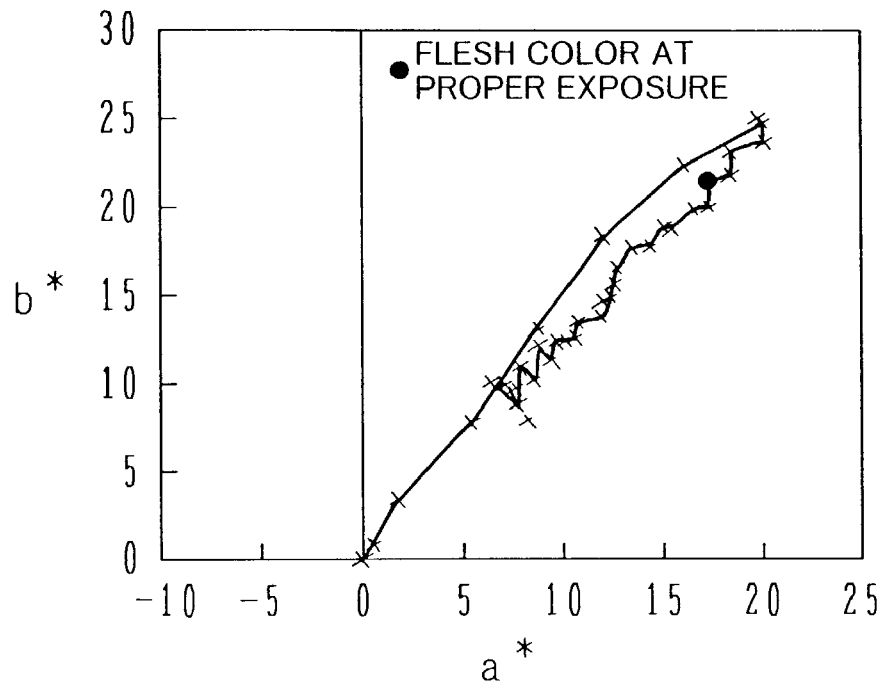
FIG. 9 is a graph showing a chromaticity point of the flesh color when a color picture processing technique according to the first embodiment of the present invention is employed.

A color signal processing technology according to the first embodiment is explained below with reference to FIGS. 7 to 9. FIG. 7 is a graph plotting the Cr/Cb ratio with respect to the luminance Y and shows a luminance dependency of a hue angle θ in the a*-b* chromaticity diagram. FIG. 8 shows the luminance dependency of the K value obtained by normalizing the Cr/Cb ratio obtained at FIG. 7. FIG. 9 shows the chromaticity points of the flesh color in the a*-b* chromaticity diagram.

As shown in FIG. 7, the Cr/Cb ratio and the hue angle θ have approximately same correlation with the luminance Y. Until the luminance Y exceeds the predetermined value (about 220 in FIG. 7), the Cr/Cb ratio and the hue angle θ are approximately constant. When the luminance exceeds the predetermined value, the Cr/Cb ratio and the hue angle θ will rapidly increase.

As shown in FIG. 8, the Cr/Cb ratio normalized by the Cr/Cb ratio at the proper exposure is approximately constant at a value "1" until the luminance is approximately 200. When the luminance exceeds 200, the K value will rapidly become small. The K value for each luminance value is obtained by the graph in FIG. 8, and the Cb is corrected by substituting the above K value to the equations (vii) and (viii) shown below. Cr is calculated by a general color difference matrix calculation.

$$Cb' = Cr \times C + Cb \times D \times K \qquad (vii),\text{ and}$$

$$Cr' = Cr \times A + Cb \times B \qquad (viii),$$

where the values of A, B, C and D are coefficient of the color difference matrix, which are set in a digital camera. Also, the values of A, B, C and D can be coefficients that has already been optimized through correction by the K value.

In FIG. 9, the chromaticity point in the a*-b* coordinates in the case when the color picture signal processing is performed by using the above-described equations (vii) and (viii) is shown. It is obvious that the hue circle is definitely suppressed and the color reproduction quality of the flesh color has improved compared to the conventional example shown in FIG. 3.

Figure 10:
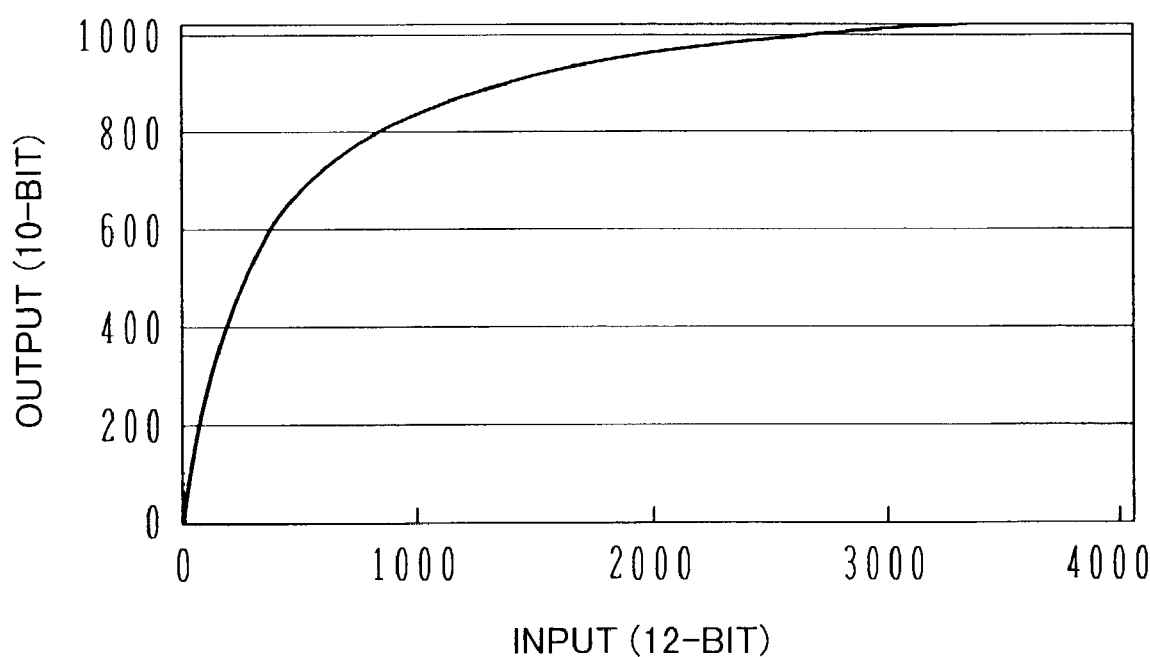
FIG. 10 is a graph showing a gamma conversion curve when a color picture processing technique according to a second embodiment of the present invention is employed and showing a range that is four times high luminance as the first embodiment of the present invention.
Figure 11:
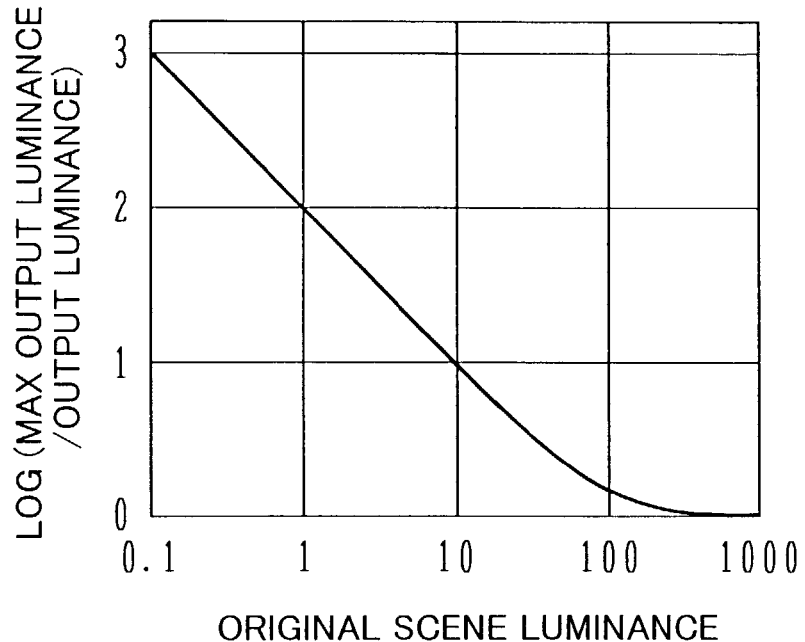
FIG. 11 is a graph showing a characteristic curve showing a relation between an original scene luminance and an output luminance when a color picture processing technique according to the second embodiment of the present invention is used.
Figure 12:
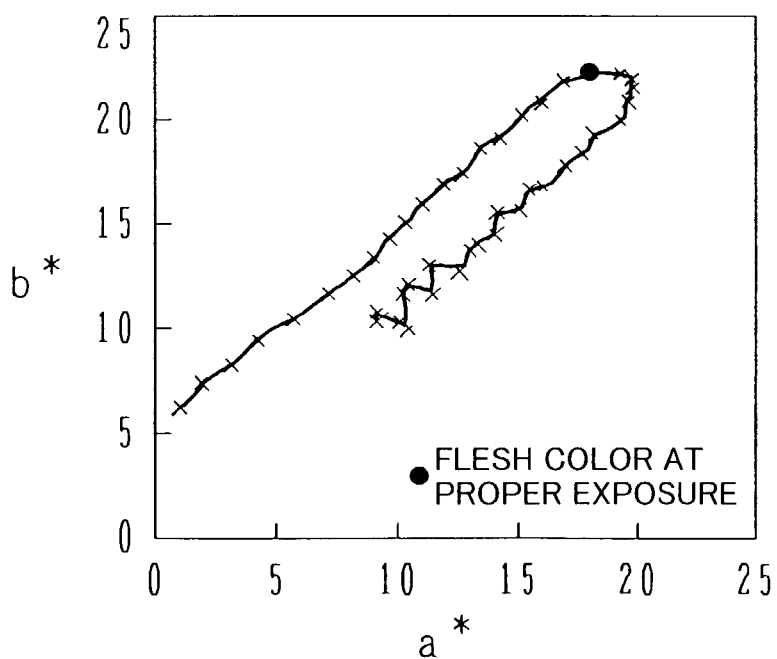
FIG. 12 is a graph showing a chromaticity point of the flesh color when a general color picture processing technique is used.
Figure 13:
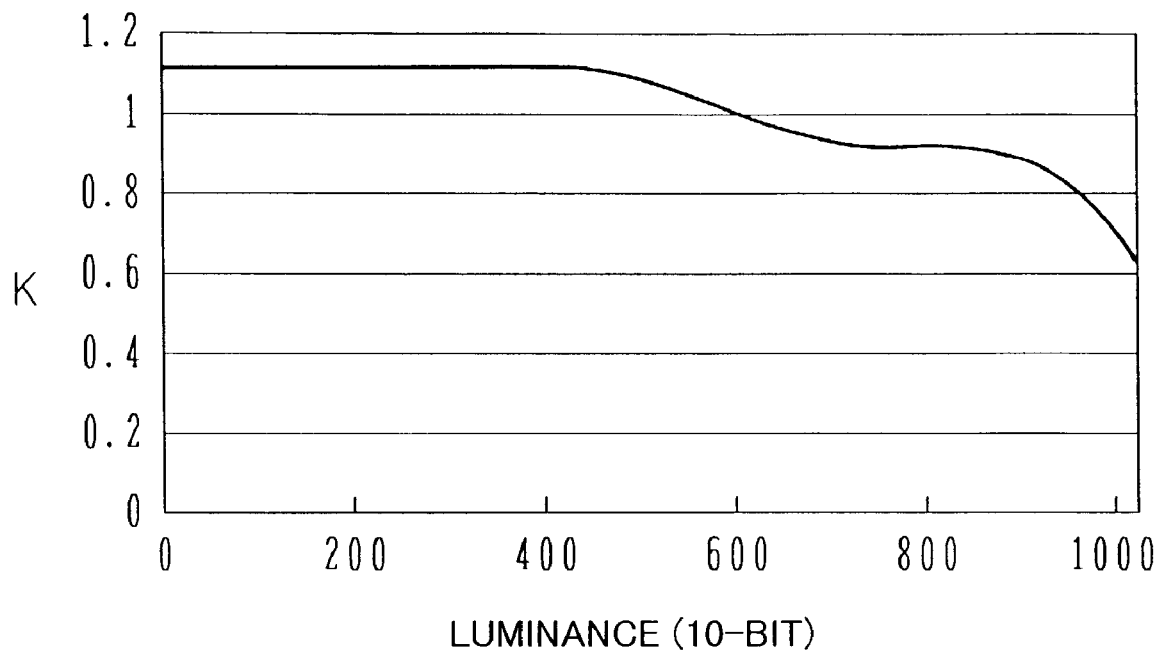
FIG. 13 is a graph showing a luminance dependency of K value when the color picture processing technique according to the second embodiment of the present invention is used.
Figure 14:
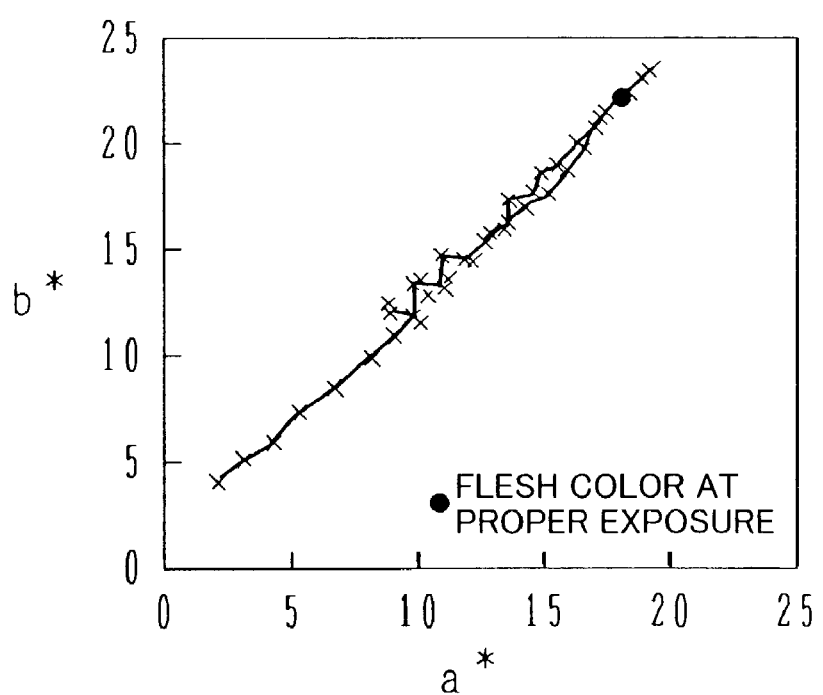
FIG. 14 is a graph showing a chromaticity point of the flesh color when the color picture processing technique according to the second embodiment of the present invention is used.

Next, the color picture signal processing technique according to a second embodiment is explained with reference to FIG. 10 to FIG. 14. FIG. 10 shows a gamma conversion curve. FIG. 11 shows a characteristic curve. The original signal luminance of the original scene is taken in the original signal up to four times (100×4=400) higher luminance than that in the case of the color picture signal processing technique according to the first embodiment. The digital signal after the A/D conversion is 12-bit and after the gamma conversion is 10-bit. FIG. 12 is a graph showing the chromaticity points of the flesh color obtained by the conventional method in the a*-b* coordinates. FIG. 13 shows the luminance dependency of the K value. FIG. 14 shows the chromaticity points of the flesh color in the a*-b* coordinates in the case when the signal processing is performed based on the K value obtained by FIG. 13.

As shown in FIG. 10, an input to the gamma conversion after the A/D conversion is 12 bit, and an output after the gamma conversion is 10 bit.

As shown in FIG. 11, an under side (a low luminance side) is a straight line as same as the case of the technique according to the first embodiment. An original scene is taken up to four times larger than that of the first embodiment in an over side (a high luminance side), and the characteristic curve is a convex tailing curve.

As shown in FIG. 12, the hue circle of the flesh color occurs when the conventional method (the method calculated by the above equations (i) and (ii)) is used, and an YG (yellow-greenish) taste flesh color at the over exposure and an R (reddish) taste flesh color at the under exposure are found. The hue circle in this case is caused by a bend in the characteristic curve.

In FIG. 13, the luminance dependency of the K value obtained by using the similar technique with the first embodiment is shown. The K value is more than 1 in the under exposure side. Then the color picture signal processing is performed based on the K value obtained by the graph shown in FIG. 13 by using the equations (ix) and (x) shown below.

$$Cr'=(Cr \times A + Cb \times B) \qquad (ix), and$$

$$Cb'=(Cr \times C + Cb \times D) \times K \qquad (x),$$

where A to D are coefficients of the color difference matrix, which have been used in digital still cameras. K is the function of luminance Y.

As shown in FIG. 14, the dependency, on the amount of the exposure, of the chromaticity points of the flesh color obtained by using the above-described color picture processing technique in the a*-b* coordinates is different from the character shown in FIG. 12, and it is found that an excellent character having a little hue circle is shown.

By using the color picture signal processing technique according to this embodiment, the hue circle of the flesh color is suppressed without using the signal processing algorithm built in the digital still cameras; however, the K value will be a different value for each signal processing algorithm. Especially, the K value greatly depends on a gamma conversion character. Also, generally the higher luminance of the original scene is taken in, the less saturation occurs and the skin color changes. In this case also, the above-described color picture signal processing technique is effective. Further, when the signal is input up to the high luminance, a grittiness of the picture tends to be caused by a decline of the SN ratio. Even when the signal cannot be input up to the high luminance, the color picture signal processing technique by the embodiment described above is effective. Although it is preferable to obtain the K value under the sunlight, which is the photographing light source that is easy to cause the hue circle, it can be obtained by other light source. Further, the effects of the decline of the hue circle of the flesh color by the consideration of the luminance dependency of the K value is effective not only under the photographing light source having the fixed K value, but also effective under the other light source. In any cases of photographing light source, taking a white balance (WB) is a presupposition. Actually the above-described effect is displayed and the color reproduction quality is satisfactory even if the white balance is slightly lost.

Figure 15:
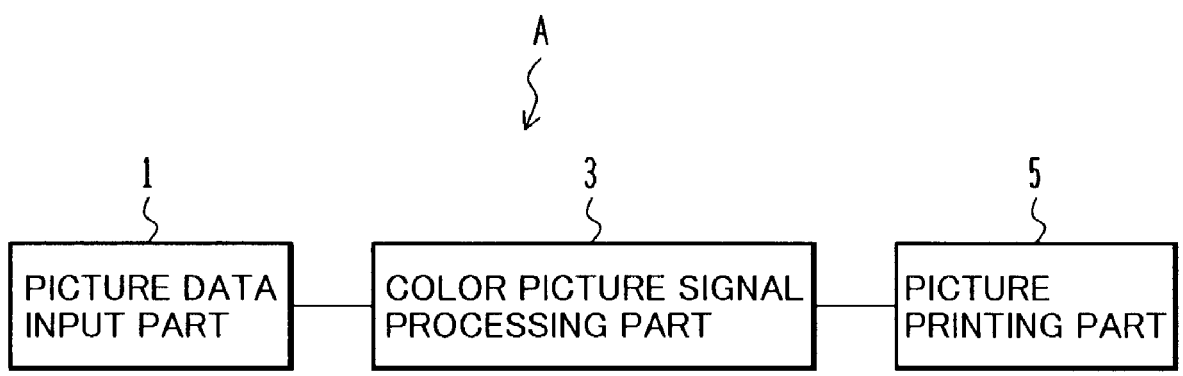
FIG. 15 is a block diagram showing a function of a color printer using a color picture processing technique according to a third embodiment of the present invention.

A printing device using the color picture data processing technology according to a third embodiment will be explained with reference to FIG. 15. FIG. 15 is a simplified functional block diagram of a structure of the printing device such as a printer or the like.

In FIG. 15, a printing device A has a picture data input part 1, a color picture processing part 3 and a picture printing part 5.

The picture data input part 1 is an inter-face part for inputting a picture data such as RGB or the like, and, for example, the RGB signal obtained by a digital still camera is input. The picture data may be input via a personal computer (PC) or directly from the digital still camera.

The color picture signal processing part 3 converts the RGB picture data to the values of Y, Cr and Cb by a signal converting process and finally provides the Y, Cr' and Cb' signals.

The picture printing part 5 prints out a color picture based on the obtained Y, Cr' and Cb' signals.

In the above-described color printer, the color picture with an excellent color reproduction quality is printed because the process to decline the hue circle of the flesh color is performed.

Figure 16:
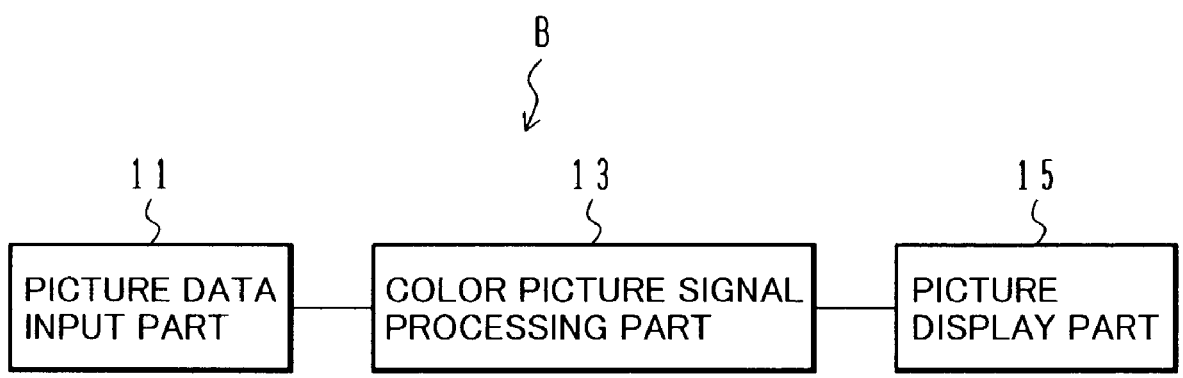
FIG. 16 is a block diagram showing a function of a display device using a color picture processing technique according to a modified example of the third embodiment of the present invention.

Then a display device using the color picture data processing technique according to the modified example of the third embodiment is explained with reference to FIG. 16. FIG. 16 is a simplified functional block diagram of the structure of a display device such as a picture monitoring device or the like.

As shown in FIG. 16, a display device B has a picture data input part 11, a color picture signal processing part 13 and a picture display part 15.

The picture data input part 11 is an inter-face part for inputting the picture data such as RGB, and, for example, the RGB signal obtained by the digital still camera is input. The picture data may be input via a personal computer (PC) or directly from the digital still camera.

The color picture signal processing part 13 converts the picture data input from the picture data input part 11 to the values of Y, Cr and Cb and finally provides the Y, Cr' and Cb' signals. The picture display part 15 displays the color picture on the monitor or the like based on the obtained Y, Cr' and Cb'.

The color picture signal processing showed in FIG. 6 can also be performed by computer software for executing the process on the computer. Also, all the calculations can be performed by fixing the K value to "1" when the luminance is smaller than the luminance of the flesh color at the proper exposure.

In the above-described color picture display device, the color picture with an excellent color reproduction quality is displayed because the process for suppressing the hue circle of the flesh color is performed.

The present invention has been described in connection with the preferred embodiments. The invention is not limited only to the above embodiments. It will be apparent for those skilled in the art that various modifications, improvements, combinations and the like can be made.

What is claimed is:

1. A color picture signal processing method, comprising the steps of:
   (a) inputting picture signal data of primary colors or complementary colors;
   (b) converting said picture signal data to data of luminance Y and data of color differences Cr and Cb on a Y-Cr-Cb space; and
   (c) executing a color difference matrix calculation by using at least one pair of equations (i) to (iv), wherein $$Cr'=Cr\times A/K+C\times B,\ Cb'=Cr\times C+Cb\times D \quad (i),$$

$$Cr'=(Cr\times A+Cb\times B)/K,\ Cb'=Cr\times C+Cb\times D \quad (ii),$$

$$Cr'=Cr\times A+Cb\times B,\ Cb'=Cr\times C+Cb\times D\times K \quad (iii), \text{ and}$$

$$Cr'=Cr\times A+Cb\times B,\ Cb'=(Cr\times C+Cb\times D)\times K \quad (iv),$$

where A, B, C and D are color difference matrix coefficients, K is a function of Y and also a correction coefficient larger than 0, K is determined to fix a color difference ratio H (=Cr'/Cb') regardless of the luminance Y, and Cr' and Cb' are color differences after correction.

2. A color picture signal processing method according to claim 1, further comprising the steps of:
   (x) calculating dependency of the color difference ratio H=Cr/Cb on the luminance Y by changing an amount of exposure, and executing said color difference matrix calculation by using K calculated by an equation (v), wherein $$K=(Cr/Cb)/(Cr/Cb)_{Y=Y0} \quad (v),$$

where $(Cr/Cb)_{Y=Y0}$ is a color difference ratio at a proper exposure.

3. A color picture signal processing method according to claim 1, wherein at least one of the executing steps of said equations (i) to (iv) is performed by referring to a look-up table representing a correlation between the coefficients and/or the variables in said equations (i) to (iv).

4. A color picture signal processing method according to claim 2, wherein at least one of the executing steps of said equations (i) to (v) is performed by referring to a look-up table representing a correlation between the coefficients and/or the variables described in said equations (i) to (v).

5. A color picture signal processing method according to claim 1, wherein said executing step is performed only for a flesh color.

6. A color picture signal processing method according to claim 2, wherein said executing step is performed only for a flesh color.

7. A color picture signal processing apparatus, comprising:
   a data input device that inputs picture signal data of primary colors or complementary colors;
   a data converter that converts said picture signal data to data of luminance Y and data of color differences Cr and Cb on a Y-Cr-Cb space; and
   a processor that executes a color difference matrix calculation by using at least one pair of equations (i) to (iv), wherein $$Cr'=Cr\times A/K+Cb\times B,\ Cb'=Cr\times C+Cb\times D \quad (i),$$

$$Cr'=(Cr\times A+Cb\times B)/K,\ Cb'=Cr\times C+Cb\times D \quad (ii),$$

$$Cr'=Cr\times A+Cb\times B,\ Cb'=Cr\times C+Cb\times D\times K \quad (iii), \text{ and}$$

$$Cr'=Cr\times A+Cb\times B,\ Cb'=(Cr\times C+Cb\times D)\times K \quad (iv),$$

where A, B, C and D are color difference matrix coefficients, K is a function of Y and a correction coefficient larger than 0, K is determined to fix a color difference ratio H (=Cr'/Cb') regardless of the luminance Y, and Cr' and Cb' are color differences after correction.

8. A color picture signal processing apparatus according to claim 7, further comprising:
   a preparatory processor that calculates dependency of the color difference ratio H=Cr/Cb on the luminance Y by changing an amount of exposure, and executes said color difference matrix calculation by using K calculated by an equation (v), wherein $$K=(Cr/Cb)/(Cr/Cb)_{Y=Y0} \quad (v)$$

where $(Cr/Cb)_{Y=Y0}$ is a color difference ratio at a proper exposure.

9. A color picture signal processing apparatus according to claim 7, wherein at least one of said processors refers to a look-up table representing a correlation between the coefficients and/or the variables in said equations (i) to (iv).

10. A color picture signal processing apparatus according to claim 8, wherein at least one of said processors refers to a look-up table representing a correlation between the coefficients and/or the variables in said equations (i) to (v).

11. A color printer, comprising:
    a picture data inputting device;
    a picture data processor comprising a color picture signal processing apparatus comprising: a data input device that inputs picture signal data of primary colors or complementary colors; a data converter that converts said picture signal data to data of luminance Y and data of color differences Cr and Cb on a Y-Cr-Cb space; and a processor that executes a color difference matrix calculation by using at least one pair of equations (i) to (iv), wherein $$Cr'=Cr\times A/K+Cb\times B,\ Cb'=Cr\times C+Cb\times D \quad (i),$$

$$Cr'=(Cr\times A+Cb\times B)/K,\ Cb'=Cr\times C+Cb\times D \quad (ii),$$

$$Cr'=Cr\times A+Cb\times B,\ Cb'=Cr\times C+Cb\times D\times K \quad (iii), \text{ and}$$

$$Cr'=Cr\times A+Cb\times B,\ Cb'=(Cr\times C+Cb\times D)\times K \quad (iv),$$

where A, B, C and D are color difference matrix coefficients, K is a function of Y and a correction coefficient larger than 0, K is determined to fix a color difference ratio H (=Cr'/Cb') regardless of the luminance Y, and Cr' and Cb' are color differences after correction; and
    a picture printing device that prints out a picture in accordance with picture data processed by said picture data processor.

12. A color picture display apparatus, comprising:

a picture data inputting device;

a picture data processor comprising a color picture signal processing apparatus comprising: a data input device that inputs picture signal data of primary colors or complementary colors; a data converter that converts said picture signal data to data of luminance Y and data of color differences Cr and Cb on a Y-Cr-Cb space; and a processor that executes a color difference matrix calculation by using at least one pair of equations (i) to (iv), wherein $$Cr' = Cr \times A/K + Cb \times B, \quad Cb' = Cr \times C + Cb \times D \qquad (i),$$

$$Cr' = (Cr \times A + Cb \times B)/K, \quad Cb' = Cr \times C + Cb \times D \qquad (ii),$$

$$Cr' = Cr \times A + Cb \times B, \quad Cb' = Cr \times C + Cb \times D \times K \qquad (iii), \text{ and}$$

$$Cr' = Cr \times A + Cb \times B, \quad Cb' = (Cr \times C + Cb \times D) \times K \qquad (iv),$$

where A, B, C and D are color difference matrix coefficients, K is a function of Y and a correction coefficient larger than 0, K is determined to fix a color difference ratio H (=Cr'/Cb') regardless of the luminance Y, and Cr' and Gb' are color differences after correction; and a picture data display device that displays picture data in accordance with picture data processed by said picture data processor.

13. A program stored on a computer readable medium for a computer to execute color picture signal processing, the program comprising the instructions of:

(a) inputting picture signal data of primary colors or complementary colors;

(b) converting said picture signal data to data of luminance Y and data of color differences Cr and Cb on a Y-Cr-Cb space; and (c) executing a color difference matrix calculation by using at least one pair of equations (i) to (iv), wherein $$Cr' = Cr \times A/K + Cb \times B, \quad Cb' = Cr \times C + Cb \times D \qquad (i),$$

$$Cr' = (Cr \times A + Cb \times B)/K, \quad Cb' = Cr \times C + Cb \times D \qquad (ii),$$

$$Cr' = Cr \times A + Cb \times B, \quad Cb' = Cr \times C + Cb \times D \times K \qquad (iii), \text{ and}$$

$$Cr' = Cr \times A + Cb \times B, \quad Cb' = (Cr \times C + Cb \times D) \times K \qquad (iv),$$

where A, B, C and D are color difference matrix coefficients, K is a function of Y and a correction coefficient larger than 0, K is determined to fix a color difference ratio H (=Cr'/Cb') regardless of the luminance Y, and Cr' and Cb' are color differences after correction.

14. A program according to claim 13, further comprising the instruction of:

(x) calculating dependency of the color difference ratio H=Cr/Cb on the luminance Y by changing an amount of exposure, and executing said color difference matrix calculation by using K calculated by an equation (v), wherein $$K = (Cr/Cb)/(Cr/Cb)_{Y=Y0} \qquad (v),$$

where $(Cr/Cb)_{Y=Y0}$ is a color difference ratio at a proper exposure.

* * * * *